(12) United States Patent
Fujiyoshi

(10) Patent No.: US 11,131,566 B2
(45) Date of Patent: Sep. 28, 2021

(54) ELECTROSTATIC SENSOR

(71) Applicant: Alps Alpine Co., Ltd., Tokyo (JP)

(72) Inventor: Tatsumi Fujiyoshi, Niigata-ken (JP)

(73) Assignee: Alps Alpine Co., Ltd., Tokyo (JP)

( * ) Notice: Subject to any disclaimer, the term of this patent is extended or adjusted under 35 U.S.C. 154(b) by 3 days.

(21) Appl. No.: 16/902,905

(22) Filed: Jun. 16, 2020

(65) Prior Publication Data

US 2020/0309570 A1 Oct. 1, 2020

Related U.S. Application Data

(63) Continuation of application No. PCT/JP2018/044539, filed on Dec. 4, 2018.

(30) Foreign Application Priority Data

Dec. 20, 2017 (JP) .............................. JP2017-243986

(51) Int. Cl.
*G01D 5/24* (2006.01)
*G06F 3/041* (2006.01)
(Continued)

(52) U.S. Cl.
CPC .................. *G01D 5/24* (2013.01); *G01D 5/14* (2013.01); *G06F 3/041* (2013.01); *G06F 3/044* (2013.01);
(Continued)

(58) Field of Classification Search
CPC .. G01D 5/00; G01D 5/12; G01D 5/14; G01D 5/24; G06F 3/00; G06F 3/01; G06F 3/03;
(Continued)

(56) References Cited

U.S. PATENT DOCUMENTS 5,540,085 A * 7/1996 Sakata ..................... G01M 3/16
324/557
9,016,198 B2 * 4/2015 Lam ..................... G03G 21/0088
101/287
(Continued)

FOREIGN PATENT DOCUMENTS

JP 2010-108501 5/2010
JP 2011-14109 1/2011
(Continued)

OTHER PUBLICATIONS

International Search Report from International Application No. PCT/JP2018/044539 dated Feb. 5, 2019.

*Primary Examiner* — Hoai-An D. Nguyen
(74) *Attorney, Agent, or Firm* — Beyer Law Group LLP

(57) ABSTRACT

An electrostatic sensor detecting a position of an object being approaching the electrostatic sensor includes a first electrode group including electrodes, a second electrode group including electrodes adjacent to the electrodes of the first electrode group, detection circuits connected to electrodes selected from among the electrodes of the first and second electrode groups and having first alternating-current sources and current measurement units, a second alternating-current source connected to unselected electrodes among the electrodes of the first and second electrode groups, and a controller. The controller successively selects electrodes to be connected to the detection circuits from among the electrodes of the first and second electrode groups, causes the selected electrodes to be connected to the detection circuits, and detects a position of the object based on current detected by the current measurement units.

11 Claims, 18 Drawing Sheets

(51) Int. Cl.
*G06F 3/044* (2006.01)
*G01D 5/14* (2006.01)

(52) U.S. Cl.
CPC ........ *G06F 3/0446* (2019.05); *G06F 3/04166* (2019.05); *G06F 2203/04107* (2013.01)

(58) Field of Classification Search
CPC .... G06F 3/041; G06F 3/0416; G06F 3/04166; G06F 3/044; G06F 3/0446; G06F 2203/04107
USPC .............. 324/600, 649, 658, 686, 76.11, 109
See application file for complete search history.

(56) References Cited

U.S. PATENT DOCUMENTS

| | | |
|---|---|---|
| 2010/0110040 A1 | 5/2010 | Kim et al. |
| 2012/0038584 A1 | 2/2012 | Liu |
| 2014/0125616 A1 | 5/2014 | Haga et al. |
| 2018/0246585 A1* | 8/2018 | Hara ..................... G06F 3/0416 |
| 2019/0384457 A1* | 12/2019 | Fujiyoshi .............. G06F 3/0445 |

FOREIGN PATENT DOCUMENTS

| | | |
|---|---|---|
| JP | 2011-128896 | 6/2011 |
| JP | 5698846 | 2/2015 |
| JP | 6038368 | 11/2016 |

\* cited by examiner

ELECTROSTATIC SENSOR

CLAIM OF PRIORITY

This application is a Continuation of International Application No. PCT/JP2018/044539 filed on Dec. 4, 2018, which claims benefit of Japanese Patent Application No. 2017-243986 filed on Dec. 20, 2017. The entire contents of each application noted above are hereby incorporated by reference.

BACKGROUND OF THE INVENTION

1. Field of the Invention

The present invention relates to an electrostatic sensor.

2. Description of the Related Art

Touch sensors are devices which detect a positional coordinate pointed by a finger, a pen, or the like or an operation indicated by a finger, a pen, or the like and are recently used for various purposes as operation input devices which input operation information. Such a touch sensor employs a resistive film method, an electrostatic method, an optical detection method, or the like. The touch sensor employing the electrostatic method, that is, a capacitive touch sensor, detects a change of an electrostatic capacitance obtained when a conductive body or a portion of a human body is close to a conductive substance and inputs operation information by detecting a position of the conductive body or the portion of the human body.

Here, some capacitive touch sensors include a lattice electrode pattern which detects a little change of an electrostatic capacitance generated when a conductive body or a portion of a human body is close to the touch sensor using detection circuits and calculate a positional coordinate on the touch sensor. Examples of the lattice electrode pattern include a pattern including diamond-shaped electrodes connected in an X direction and a pattern including diamond-shaped electrodes connected in a Y direction. Such touch sensors are disclosed in Japanese Unexamined Patent Application Publication No. 2011-14109, Japanese Patent Nos. 5698846 and 6038368, for example.

There is a demand for a capacitive touch sensor having higher detection sensitivity. For example, when a car including a touch sensor installed therein is operated by a driver, it is preferable that a touch is detected not only in a case where the capacitive touch sensor is directly touched by a finger of the driver or the like, but also in a case where the capacitive touch sensor is touched by a finger with a glove.

Therefore, a capacitive touch sensor having higher detection sensitivity is demanded.

SUMMARY OF THE INVENTION

According to an aspect of an embodiment, an electrostatic sensor which detects a position of an object to be detected which is approaching the electrostatic sensor, includes a first electrode group including a plurality of electrodes, a second electrode group including a plurality of electrodes which are adjacent to the electrodes of the first electrode group, detection circuits configured to be individually connected to electrodes selected from among the electrodes of the first electrode group and the electrodes of the second electrode group and have respective first alternating-current sources and respective current measurement units, a second alternating-current source configured to be connected to unselected electrodes among the electrodes of the first electrode group and the electrodes of the second electrode group, and a controller. Alternating voltage generated by the first alternating-current sources and alternating voltage generated by the second alternating-current source have the same frequency and the same phase. The controller successively selects electrodes to be connected to the detection circuits from among the electrodes of the first electrode group and the electrodes of the second electrode group, causes the selected electrodes to be connected to the detection circuits, and detects a position of the object to be detected based on current detected by current measurement units included in the detection circuits.

According to the disclosed capacitive touch sensor, detection sensitivity may be improved.

DESCRIPTION OF THE PREFERRED EMBODIMENTS

Figure 1:
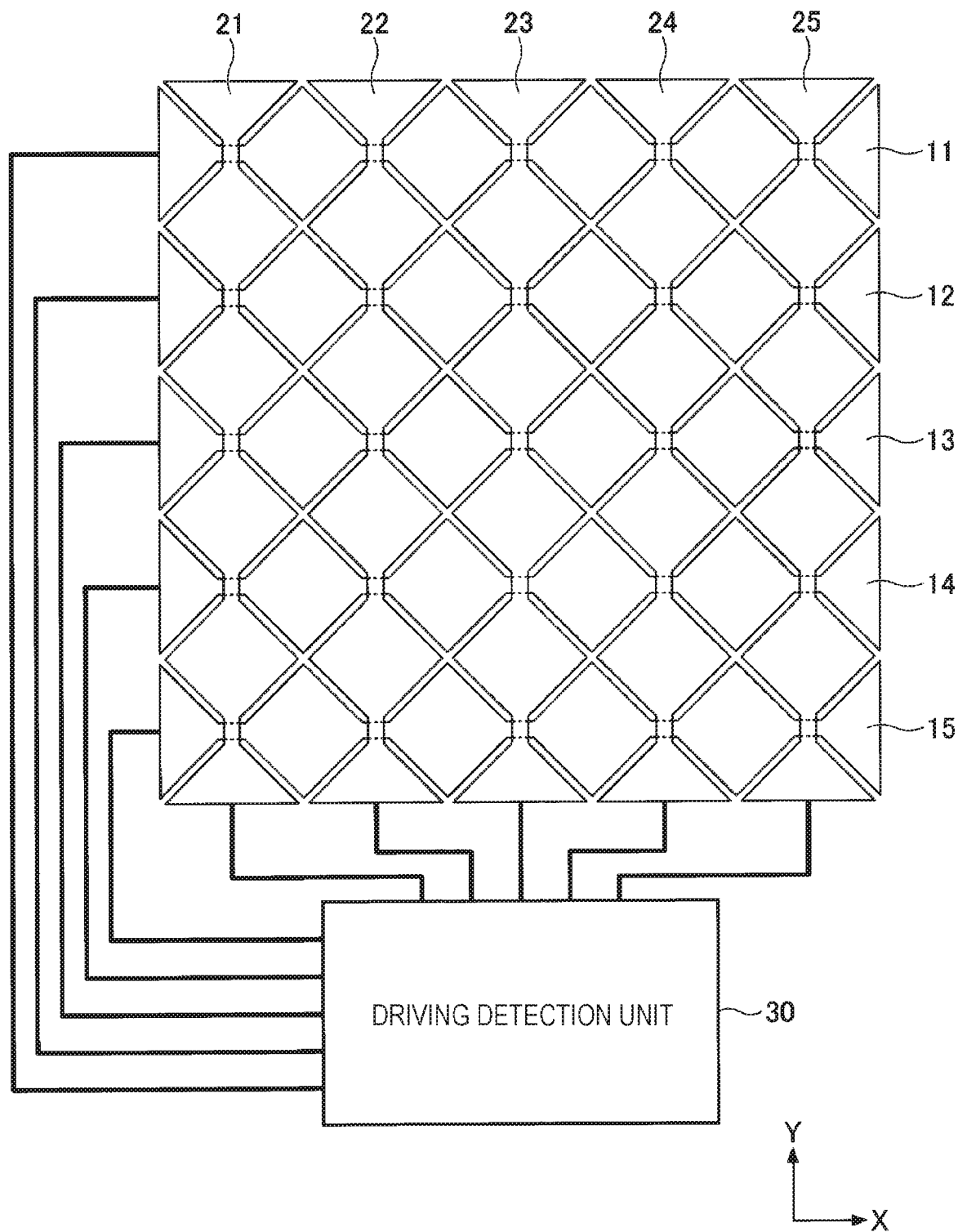
FIG. 1 is a diagram illustrating a configuration of a touch sensor.

Embodiments of the present invention will be described hereinafter. Note that the same components are denoted by the same reference numerals and redundant descriptions thereof are omitted.

First Embodiment

First, a position detection method employed in a capacitive touch sensor having lattice electrode patterns will be described. The capacitive touch sensor having lattice electrode patterns includes X-direction electrodes 11 to 15 and Y-direction electrodes 21 to 25 as illustrated in FIG. 1. In each of the X-direction electrodes 11 to 15, a plurality of diamond-shaped electrode patterns are connected to one another in the X direction which is a longitudinal direction, and in each of the Y-direction electrodes 21 to 25, a plurality of diamond-shaped electrode patterns are connected to one another in the Y direction which is a longitudinal direction. The X-direction electrodes 11 to 15 are successively disposed along the Y direction, the Y-direction electrodes 21 to 25 are successively disposed along the X direction, and the diamond-shaped electrode patterns of the Y-direction electrodes 21 to 25 are formed among the diamond-shaped electrode patterns of the X-direction electrodes 11 to 15.

Note that, in general, although the X-direction electrodes 11 to 15 are arranged in the Y direction to detect Y coordinates, and therefore, may be referred to as Y electrodes and the Y-direction electrodes 21 to 25 are arranged in the X direction to detect X coordinates, and therefore, may be referred to as X electrodes, the electrodes 11 to 15 are referred to as the X-direction electrodes 11 to 15 and the electrodes 21 to 25 are referred to as the Y-direction electrodes 21 to 25 for convenience sake. Furthermore, in the present disclosure, the X-direction electrodes 11 to 15 are referred to as electrodes in a first electrode group and the Y-direction electrodes 21 to 25 are referred to as electrodes in a second electrode group where appropriate. Furthermore, the X direction is along an X axis, the Y direction is along a Y axis, and the X direction and the Y direction are orthogonal to each other. A plane which is in parallel to a flat plane of the touch sensor corresponds to an XY plane, and a direction which is vertical to the flat plane of the touch sensor, that is, a direction which is vertical to the XY plane, is a Z direction.

In portions in which the X-direction electrodes 11 to 15 intersect with the Y-direction electrode 21 to 25, the X-direction electrodes 11 to 15 are formed beneath the Y-direction electrodes 21 to 25, and in this intersecting portions, spaces or insulating films, not illustrated, are formed between the X-direction electrodes 11 to 15 and the Y-direction electrodes 21 to 25 so that the X-direction electrodes 11 to 15 are insulated from the Y-direction electrodes 21 to 25.

In the touch sensor illustrated in FIG. 1, the individual X-direction electrodes 11 to 15 and the individual Y-direction electrodes 21 to 25 are connected to a driving detection unit 30, and AC voltage may be applied to the individual X-direction electrodes 11 to 15 and the individual Y-direction electrodes 21 to 25 under control of the driving detection unit 30.

Figure 2:
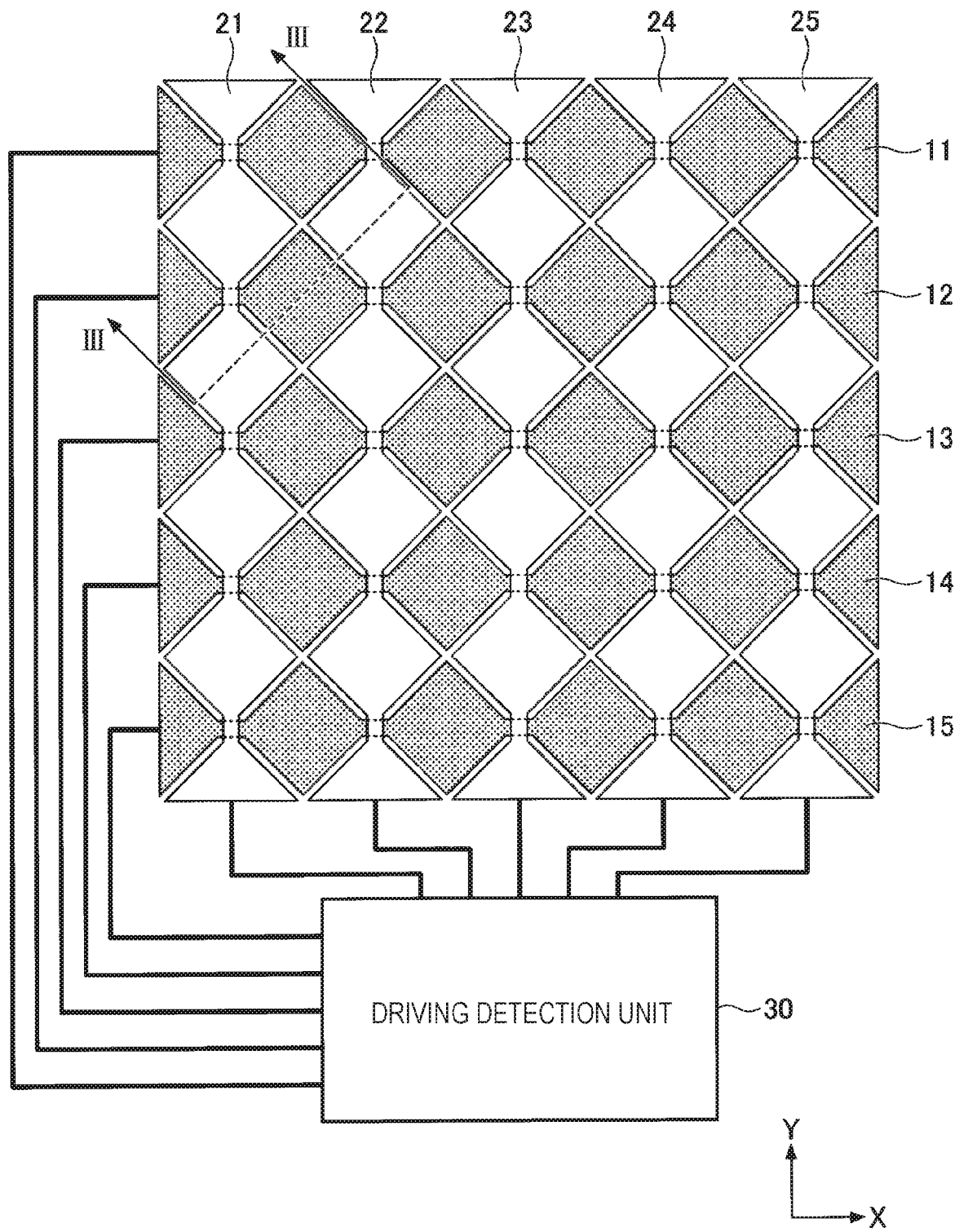
FIG. 2 is a diagram illustrating the touch sensor when electrodes are in a first connection state.
Figure 3:
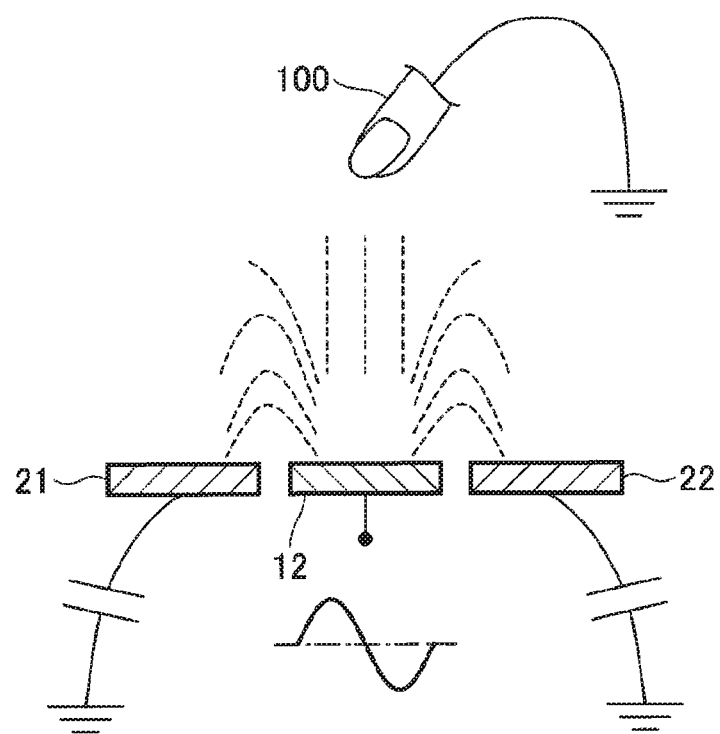
FIG. 3 is a cross-sectional view of the touch sensor.

When a position of a finger or the like is detected using the touch sensor, first, AC voltage is applied to the X-direction electrodes 11 to 15 as illustrated in FIG. 2 (halftone dot portions). In this case, the Y-direction electrodes 21 to 25 are in a floating state in which voltage is not applied or are connected to the ground potential or the like. FIG. 3 is a cross-sectional view taken along a broken line III to III in FIG. 2. In this state, the AC voltage is applied to the X-direction electrodes 11 to 15, and therefore, electric lines of force are generated in a substantially vertical direction relative to a plane of the X-direction electrode 12, for example, as illustrated by dotted lines in FIG. 3. In this way, an electric field is generated in the X-direction electrodes 11 to 15, and therefore, when a finger 100 or the like which is an object to be detected approaches the touch sensor, a capacitance is generated between the finger 100 and an electrode pattern and a largest amount of current is supplied to an electrode having the electrode pattern positioned closest to the finger 100 or the like. Accordingly, a position of a Y coordinate of the finger 100 or the like may be specified by specifying one of the X-direction electrodes 11 to 15 which receives the largest amount of current.

Figure 4:
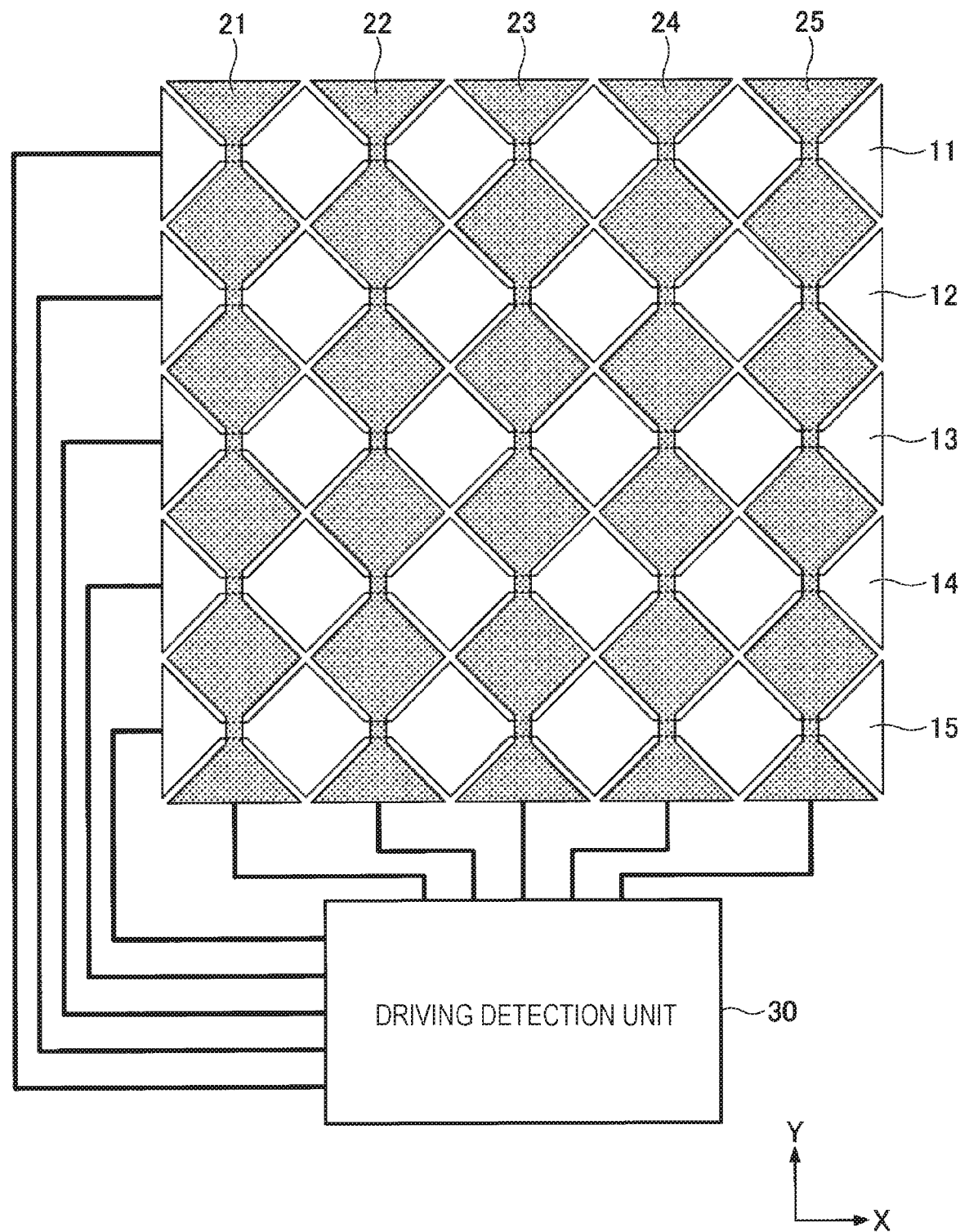
FIG. 4 is a diagram illustrating the touch sensor when electrodes are in a second connection state.

Subsequently, AC voltage is supplied to the Y-direction electrodes 21 to 25 (halftone dot portions) as illustrated in FIG. 4. In this case, the X-direction electrodes 11 to 15 are in the floating state in which voltage is not applied or are connected to the ground potential or the like. In this state, AC voltage is applied to the Y-direction electrodes 21 to 25, and electric lines of force are generated in a substantially vertical direction relative to a plane of the Y-direction electrodes 21 to 25. In this way, electric fields are generated in the Y-direction electrodes 21 to 25, and therefore, when the finger 100 or the like approaches the touch sensor, a capacitance is generated between the finger 100 or the like and an electrode pattern and a largest amount of current is supplied to an electrode having the electrode pattern positioned closest to the finger 100 or the like. Accordingly, a position of an X coordinate of the finger 100 or the like may be specified by specifying one of the Y-direction electrodes 21 to 25 which receives the largest amount of current.

In this way, positions of the finger 100 or the like may be consecutively detected so that a movement of the finger 100 or the like may be obtained by repeatedly performing applying of the AC voltage to the X-direction electrodes 11 to 15 and applying of the AC voltage to the Y-direction electrodes 21 to 25.

Here, in the touch sensor illustrated in FIG. 1, components of electric lines of force toward the Y-direction electrodes 21 and 22 having diamond-shaped electrode patterns which are closest to the X-direction electrode 12 or the like are generated from the X-direction electrode 12 or the like to which the AC voltage is applied as illustrated in FIG. 3. Therefore, detection sensitivity is degraded since electric field distribution becomes weak and an equipotential surface considerably bends in the vicinity of the diamond-shaped electrode pattern of the X-direction electrode 12, and therefore, excellent directivity is not attained and accuracy of a detection position is degraded. Therefore, a touch sensor having higher detection sensitivity and higher accuracy of position detection is demanded.

Touch Sensor

Figure 5:
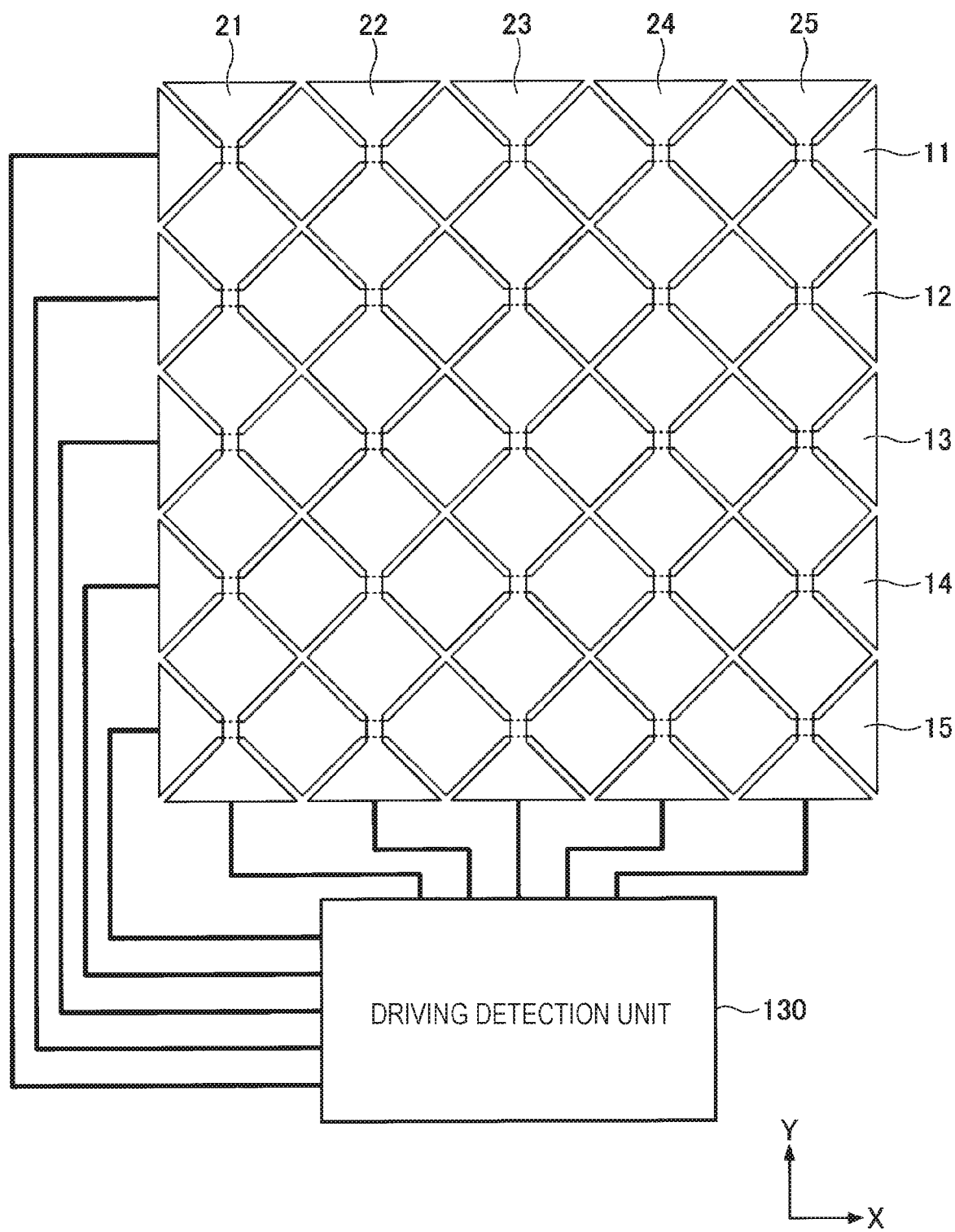
FIG. 5 is a diagram illustrating a configuration of a touch sensor according to a first embodiment.

Next, a touch sensor which is an electrostatic sensor according to the first embodiment will be described. In the touch sensor according to this embodiment, the individual X-direction electrodes 11 to 15 and the individual Y-direction electrodes 21 to 25 are connected to a driving detection unit 130 as illustrated in FIG. 5, and AC voltage is applied to the individual X-direction electrodes 11 to 15 and the individual Y-direction electrodes 21 to 25.

Figure 6:
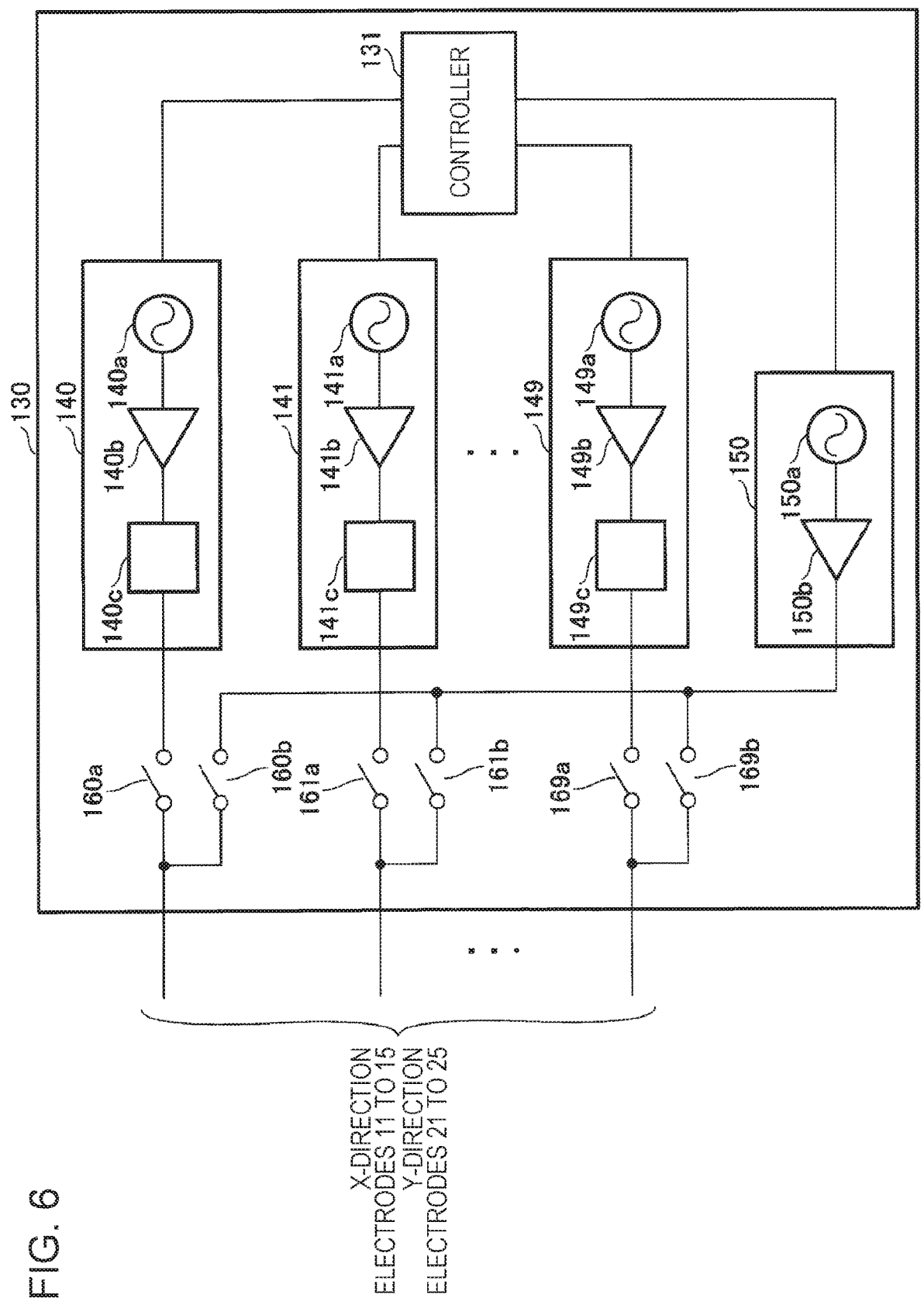
FIG. 6 is a diagram illustrating a configuration of a driving detection unit of a touch sensor according to the first embodiment.

As illustrated in FIG. 6, the driving detection unit 130 includes a controller 131, a plurality of detection circuits 140 to 149, and a shield driving circuit 150. The detection circuits 140 to 149 individually apply AC voltage to a selected number of the X-direction electrodes 11 to 15 and the Y-direction electrodes 21 to 25 and measure supplied current. Furthermore, the shield driving circuit 150 applies AC voltage to the others of the X-direction electrodes 11 to 15 and the Y-direction electrodes 21 to 25 which are not selected.

Specifically, the detection circuit 140 includes an alternating-current source 140a, an amplifier 140b, and an ammeter 140c. The amplifier 140b amplifies alternating current generated in the alternating-current source 140a to obtain a desired amplitude and supplies the amplified alternating current through the ammeter 140c. The same is true of the detection circuits 141 to 149, and the detection circuits 141 to 149 include alternating-current sources 141a to 149a, amplifiers 141b to 149b, and ammeters 141c to 149c, respectively. The amplifiers 141b to 149b amplify alternating current generated in the corresponding alternating-current sources 141a to 149a to obtain desired amplitudes and supply the amplified alternating current through the corresponding ammeters 141c to 149c. In the present disclosure, the ammeters 140c to 149c are referred to as current measurement units where appropriate. The detection circuits 140 to 149 are not limited to this configuration and charge amplifiers using operational amplifiers may be used.

Furthermore, the shield driving circuit 150 includes an alternating-current source 150a and an amplifier 150b which amplifies alternating current generated in the alternating-current source 150a to obtain desired amplitude and supplies the amplified alternating current. Note that the alternating current generated in the alternating-current sources 140a to 149a and the alternating current generated in the alternating-current source 150a have the same frequency and the same phase. In the present disclosure, the alternating-current sources 140a to 149a are referred to as first alternating-current sources, and the alternating-current source 150a is referred to as a second alternating-current source where appropriate.

The X-direction electrodes 11 to 15 and the Y-direction electrodes 21 to 25 are connected to the driving detection unit 130, and the driving detection unit 130 includes switches for connecting the electrodes to the detection circuits 140 to 149 or the shield driving circuit 150. Specifically, the driving detection unit 130 includes switches 160a to 169a for connection between the electrodes to the detection circuits 140 to 149 and switches 160b to 169b for connection between the electrodes to the shield driving circuit 150. When the switches 160a to 169a are closed, the corresponding switches 160b to 169b are opened, whereas when the switches 160a to 169a are opened, the corresponding switches 160b to 169b are closed.

It is assumed that the switches 160a and 160b are connected to the X-direction electrode 11, the detection circuit 140 is connected to the switch 160a, and the shield driving circuit 150 is connected to the switch 160b. When the switch 160a is closed, the X-direction electrode 11 is electrically connected to the detection circuit 140, the detection circuit 140 applies AC voltage, and the ammeter 140c measures current to be supplied to the X-direction electrode 11. In this case, the switch 160b is opened.

Figure 7:
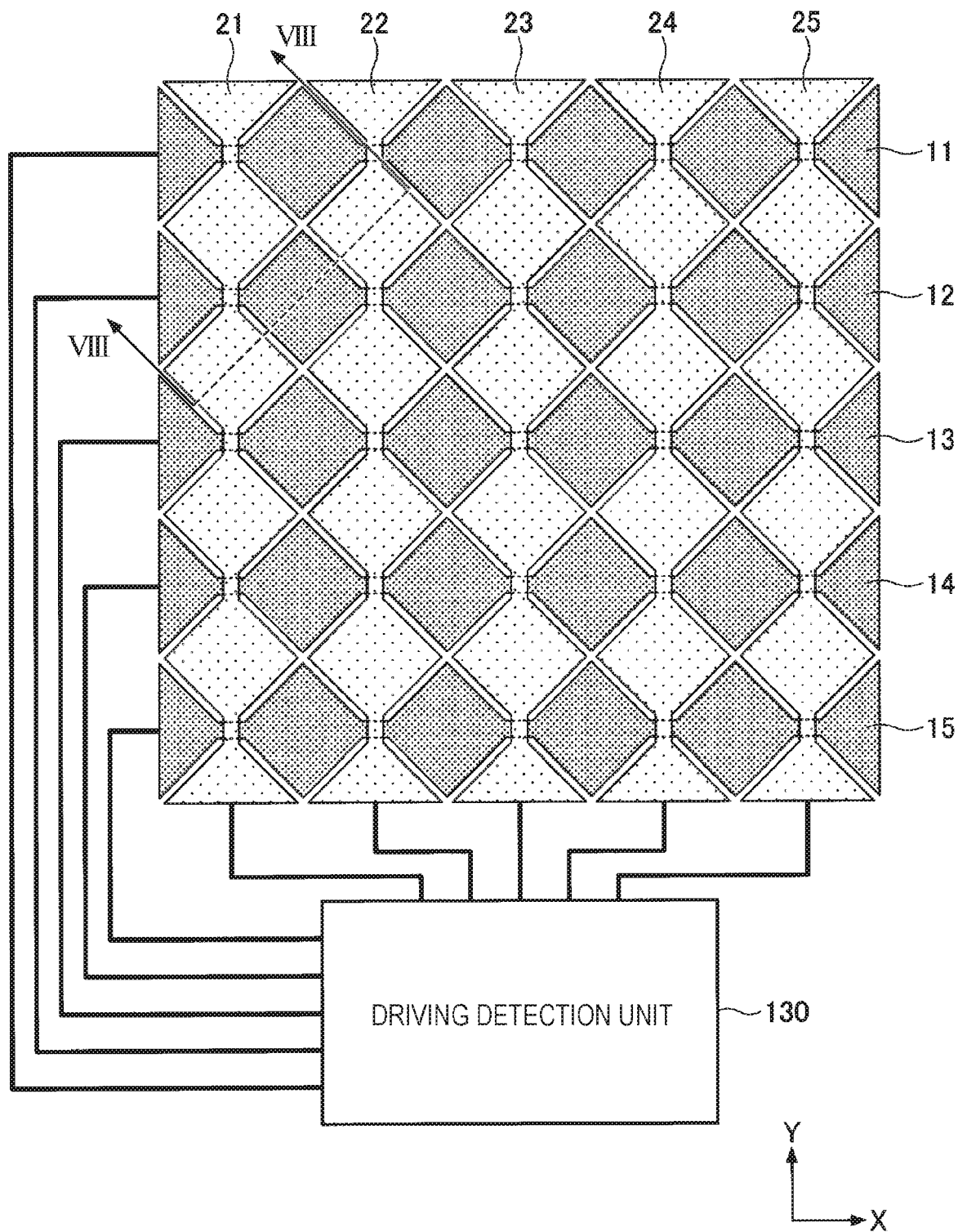
FIG. 7 is a diagram illustrating the touch sensor when the electrodes are in a first connection state, according to the first embodiment.
Figure 8:
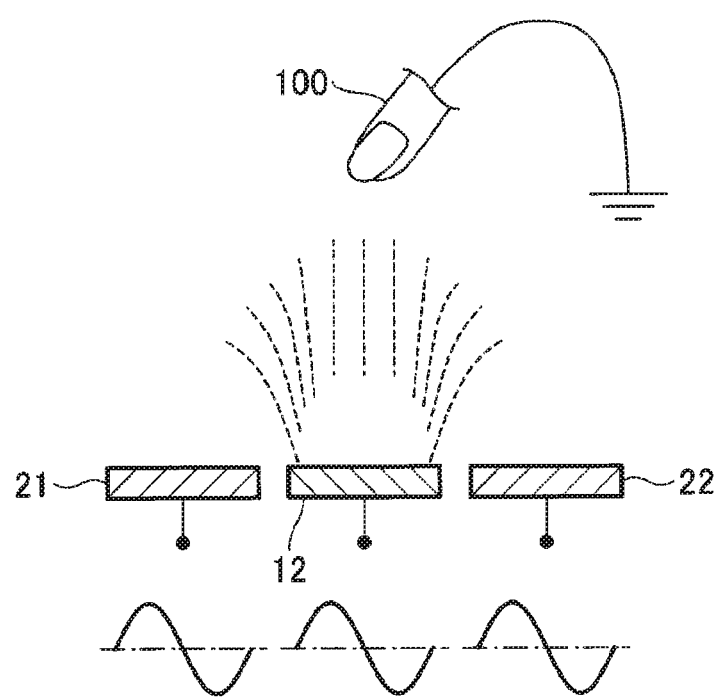
FIG. 8 is a cross-sectional view of the touch sensor according to the first embodiment.

When a position of a finger or the like is detected by the touch sensor of this embodiment, first, the X-direction electrodes 11 to 15 are connected to the corresponding five of the detection circuits 140, 141, and so on, and the Y-direction electrodes 21 to 25 are connected to the shield driving circuit 150. In this state, alternating voltage is applied to the X-direction electrodes 11 to 15 and furthermore, alternating voltage is also applied to the Y-direction electrodes 21 to 25. In the present disclosure, the electrodes connected to the detection circuits 140, 141, and so on are referred to as selected electrodes and the electrodes which are not connected to the detection circuits 140, 141, and so on but connected to the shield driving circuit 150 are referred to as non-selected electrodes where appropriate. FIG. 8 is a cross-sectional view taken along a broken line VIII to VIII in FIG. 7.

In this state, alternating voltage is applied to the X-direction electrodes 11 to 15 and the Y-direction electrodes 21 to 25, and electric lines of force are generated in a substantially vertical direction relative to planes of the X-direction electrodes 12 and so on and the Y-direction electrodes 21, 22, and so on as illustrated by a dotted line in FIG. 8. In this way, electric fields are generated both in the X-direction electrodes 11 to 15 and the Y-direction electrodes 21 to 25, and therefore, when the finger 100 or the like approaches the touch sensor, a capacitance is generated between the finger 100 or the like and electrode patterns and a largest amount of current is supplied to an electrode having an electrode pattern positioned closest to the finger 100 or the like. Since the X-direction electrodes 11 to 15 are connected to the detection circuits 140, 141, and so on, a position of a Y coordinate of the finger 100 or the like may be specified by specifying one of the X-direction electrodes 11 to 15 which receives a largest amount of current.

In this embodiment, alternating voltage of the same amplitude is applied to the Y-direction electrodes 21 and 22 which are adjacent to the X-direction electrode 12 as illustrated in FIG. 8, and therefore, electric lines of force toward the Y-direction electrodes 21 and 22 is not generated from the X-direction electrode 12 and the like, density of the electric lines of force is high, and therefore, detection sensitivity may be improved. Furthermore, an equipotential surface does not considerably bend in a portion near the diamond-shaped electrode patterns of the X-direction electrode 12, and therefore, directivity and accuracy of a detection position may be improved.

Figure 9:
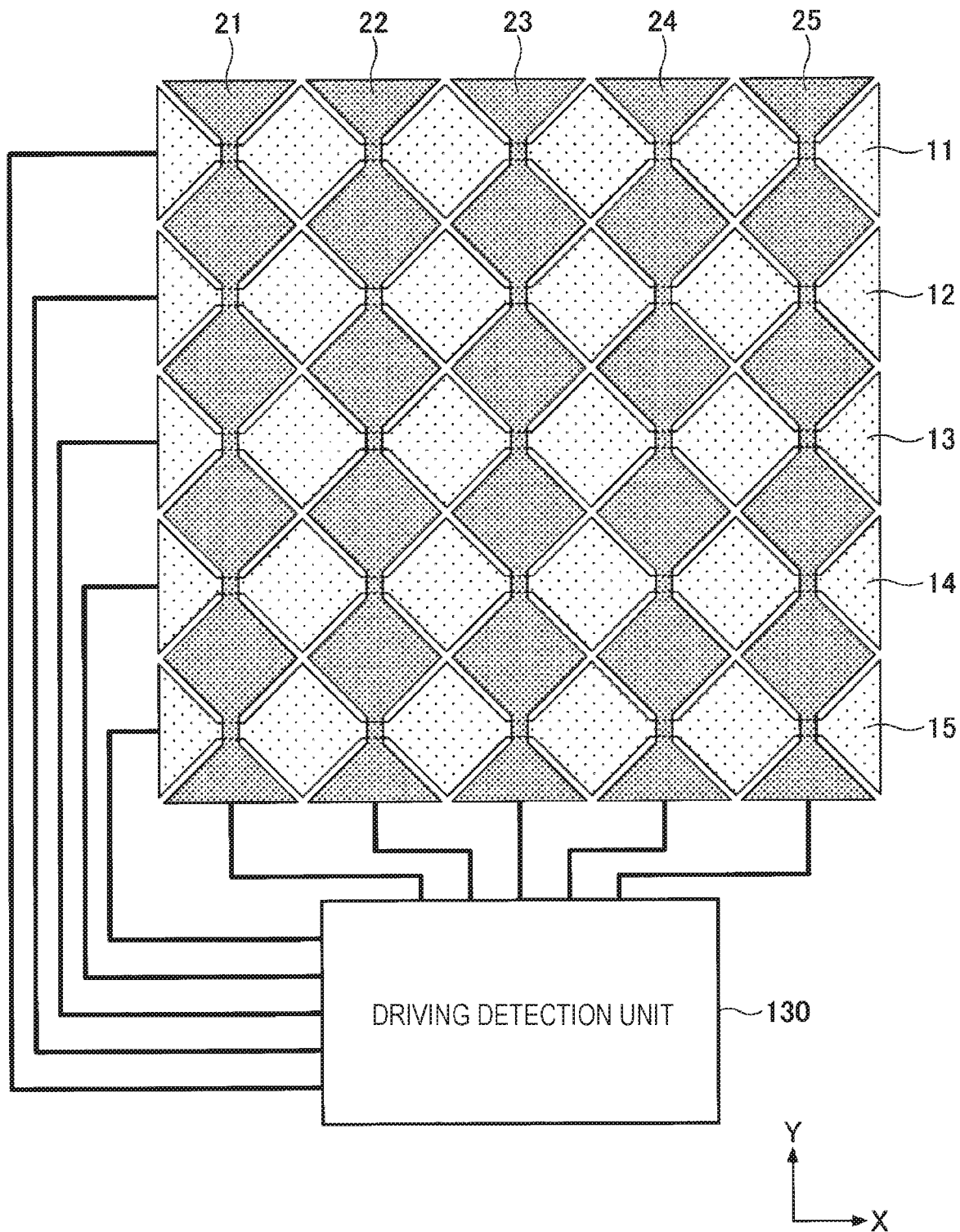
FIG. 9 is a diagram illustrating the touch sensor when the electrodes are in a second connection state, according to the first embodiment.

Subsequently, as illustrated in FIG. 9, the Y-direction electrodes 21 to 25 are connected to the corresponding detection circuits 149 and the like, and the X-direction electrodes 11 to 15 are connected to the shield driving circuit 150 as illustrated in FIG. 9. In this state, alternating voltage is applied to the X-direction electrodes 11 to 15 and furthermore, alternating voltage is also applied to the Y-direction electrodes 21 to 25. Therefore, alternating voltage is applied to the X-direction electrodes 11 to 15 and the Y-direction electrodes 21 to 25, and electric lines of force are generated in a substantially vertical direction relative to planes of the X-direction electrodes 11 to 15 and the Y-direction electrodes 21 to 25. In this way, electric fields are generated in the X-direction electrodes 11 to 15 and the Y-direction electrodes 21 to 25, and therefore, when the finger 100 or the like approaches the touch sensor, a capacitance is generated between the finger 100 or the like and the electrode patterns and a largest amount of current is supplied to an electrode having one of the electrode patterns positioned closest to the finger 100 or the like. Since the Y-direction electrodes 21 to 25 are connected to the detection circuits 149 and the like, a position of an X coordinate of the finger 100 or the like may be specified by specifying one of the X-direction electrodes 11 to 15 which receives a largest amount of current.

Accordingly, in the touch sensor according to this embodiment, electrodes selected from among the X-direction electrodes 11 to 15 and the Y-direction electrodes 21 to 25 are connected to the corresponding detection circuits and electrodes which are not connected to the detection circuits, that is, non-selected electrodes, are connected to the shield driving circuit, and this operation is repeatedly performed. Specifically, in the driving detection unit 130, based on control of the controller 131, among the X-direction electrodes 11 to 15 and the Y-direction electrodes 21 to 25, selected electrodes which are to be connected to the corresponding detection circuits are successively selected and are connected to the corresponding detection circuits. By this, positions of the finger 100 or the like may be consecutively detected so that a movement of the finger 100 or the like is detected. Note that the state illustrated in FIG. 7 and the state illustrated in FIG. 9 are repeated in this embodiment, and a period of this repetition is in a range from 2 kHz to 5 kHz.

Therefore, the touch sensor according to this embodiment has higher density of electric lines of force and attains improved detection sensitivity, when compared with the touch sensor illustrated in FIG. 1. Furthermore, a larger number of electric lines of force in the Z direction are generated relative to the diamond-shaped electrode patterns of the X-direction electrodes 11 to 15 and the diamond-shaped electrode patterns of the Y-direction electrodes 21 to 25, and therefore, directivity and accuracy of a detection position may be improved.

Furthermore, in the touch sensor illustrated in FIG. 1, when water droplets are attached between the X-direction electrodes 11 to 15 and the Y-direction electrodes 21 to 25, false detection may occur as if an operation by the finger 100 is performed. However, according to this embodiment, since alternating voltage of the same amplitude is applied to the X-direction electrodes 11 to 15 and the Y-direction electrodes 21 to 25 and the X-direction electrodes 11 to 15 and the Y-direction electrodes 21 to 25 have the same potential, even when water droplets are attached between the X-direction electrodes 11 to 15 and the Y-direction electrodes 21 to 25, false detection in which the water droplets are attached due to an operation performed by the finger 100 may be avoided.

As described above, the touch sensor according to this embodiment has higher sensitivity and higher directivity and more effectively avoid false detection caused by water. A result is illustrated in Table 1.

TABLE 1

|  | Sensitivity | Directivity | Suppression of False Detection due to Water |
|---|---|---|---|
| Touch Sensor of First Embodiment | High | High | High |
| Touch Sensor Having Configuration of FIG. 1 | Low | Low | Low |

Second Embodiment

Next, a method for driving a touch sensor according to a second embodiment will be described. In this embodiment, a method for driving the touch sensor illustrated in FIG. 5 which is employed in a case where the number of driving circuits is smaller than the number of X-direction electrodes or Y-direction electrodes is illustrated. For example, a case where the number of X-direction electrodes 11 to 15 is 5, the number of Y-direction electrodes 21 to 25 is 5, and the number of driving circuits included in a controller is 4 will be described as an example. In this case, the driving circuits may not be simultaneously connected to the X-direction electrodes 11 to 15, and the driving circuits may not be simultaneously connected to the Y-direction electrodes 21 to 25.

Figure 10:
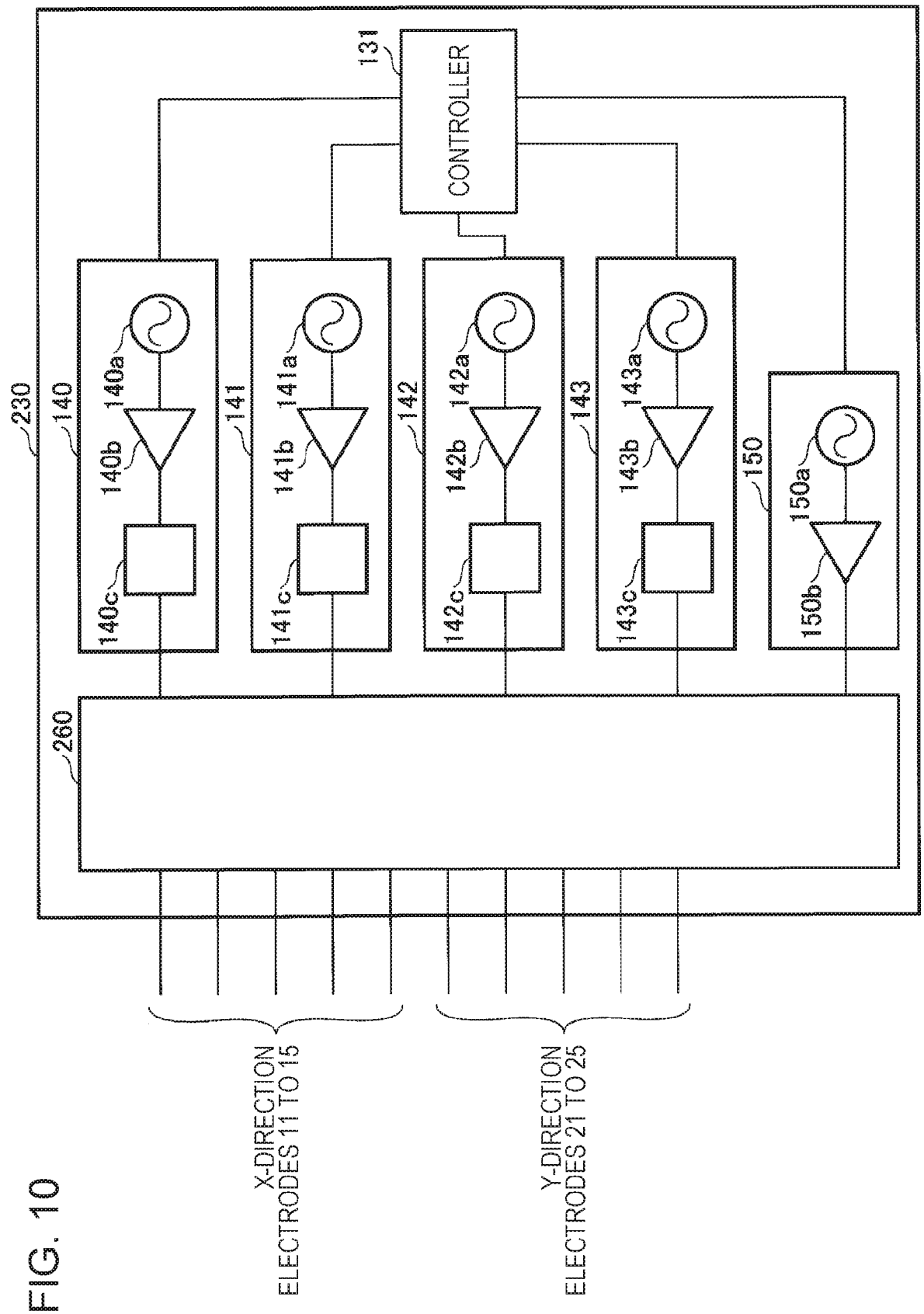
FIG. 10 is a diagram illustrating a configuration of a driving detection unit of a touch sensor according to a second embodiment.

Specifically, as illustrated in FIG. 10, a driving detection unit 230 includes four detection circuits 140 to 143, the number of detection circuits 140 to 143 being smaller than the number of X-direction electrodes 11 to 15 or the number of the Y-direction electrodes 21 to 25, and a shield driving circuit 150. The driving detection unit 230 includes a controller 131 which controls various operations in the driving detection unit 230.

According to this embodiment, the driving detection unit 230 includes a selector 260, and lines of the X-direction electrodes 11 to 15 and the Y-direction electrodes 21 to 25 connected to the driving detection unit 230 are connected to the selector 260 included in the driving detection unit 230. Furthermore, the detection circuits 140 to 143 and the shield driving circuit 150 are connected to the selector 260 which selectively connects the X-direction electrodes 11 to 15 and the Y-direction electrodes 21 to 25 to the detection circuits 140 to 143 and the shield driving circuit 150. Specifically, electrodes selected from among the X-direction electrodes 11 to 15 and the Y-direction electrodes 21 to 25 are connected to the detection circuits 140 to 143 and the other electrodes which are not selected are connected to the shield driving circuit 150.

Next, the method for driving the touch sensor according to this embodiment will be described with reference to FIGS. 11 to 13.

Figure 11:
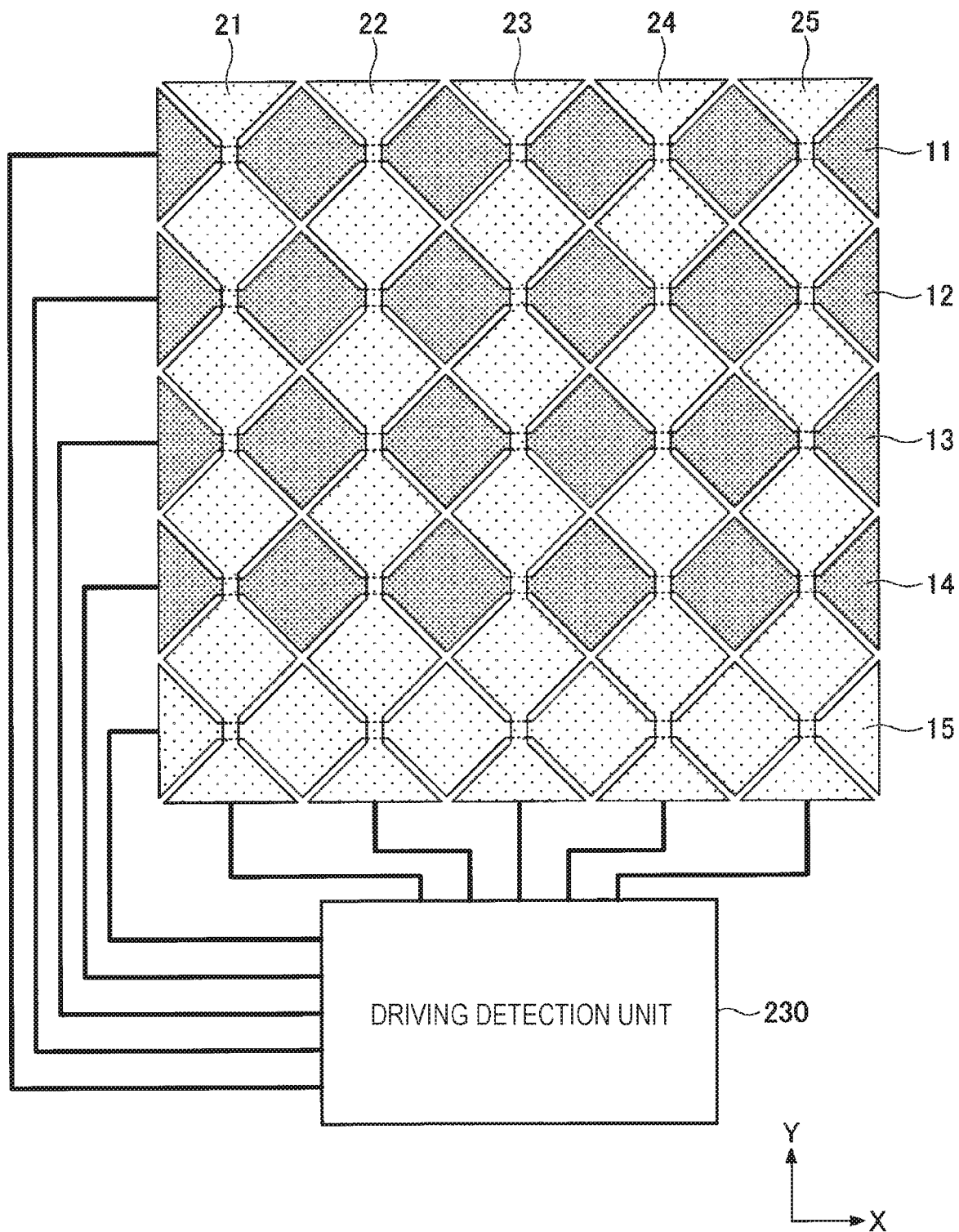
FIG. 11 is a diagram illustrating the touch sensor when the electrodes are in a first connection state, according to the second embodiment.

In the method for driving the touch sensor in this embodiment, as illustrated in FIG. 11, first, the selector 260 connects the X-direction electrode 11 to the detection circuit 140, the X-direction electrode 12 to the detection circuit 141, the X-direction electrode 13 to the detection circuit 142, the X-direction electrode 14 to the detection circuit 143, and the X-direction electrode 15 and the Y-direction electrodes 21 to 25 to the shield driving circuit 150. In this state, alternating voltage is applied to the X-direction electrodes 11 to 15 and the Y-direction electrodes 21 to 25, and the X-direction electrodes 11 to 14 connected to the detection circuits 140 to 143 may measure current supplied to the X-direction electrodes 11 to 14 using ammeters 140c to 143c included in the detection circuits 140 to 143, respectively.

Figure 12:
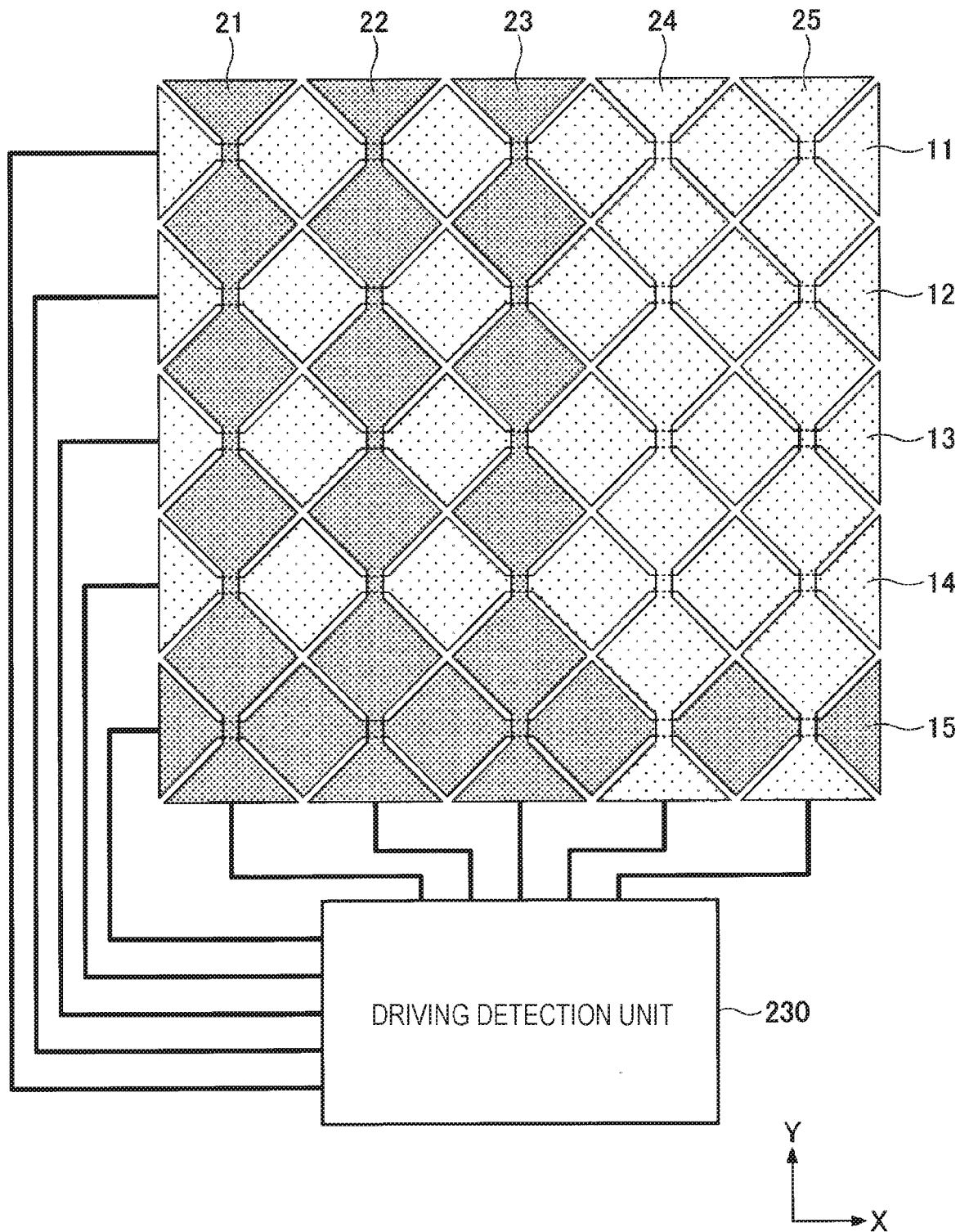
FIG. 12 is a diagram illustrating the touch sensor when the electrodes are in a second connection state, according to the second embodiment.

Subsequently, as illustrated in FIG. 12, the selector 260 connects the X-direction electrode 15 to the detection circuit 140, the Y-direction electrode 21 to the detection circuit 141, the Y-direction electrode 22 to the detection circuit 142, the Y-direction electrode 23 to the detection circuit 143, and the X-direction electrodes 11 to 14 and the Y-direction electrodes 24 and 25 to the shield driving circuit 150. In this state, alternating voltage is applied to the X-direction electrodes 11 to 15 and the Y-direction electrodes 21 to 25, and the X-direction electrode 15 and the Y-direction electrodes 21 to 23 which are connected to the detection circuits 140 to 143 may measure current supplied to the X-direction electrode 15 and the Y-direction electrodes 21 to 23 using the ammeters 140c to 143c included in the detection circuits 140 to 143, respectively.

Figure 13:
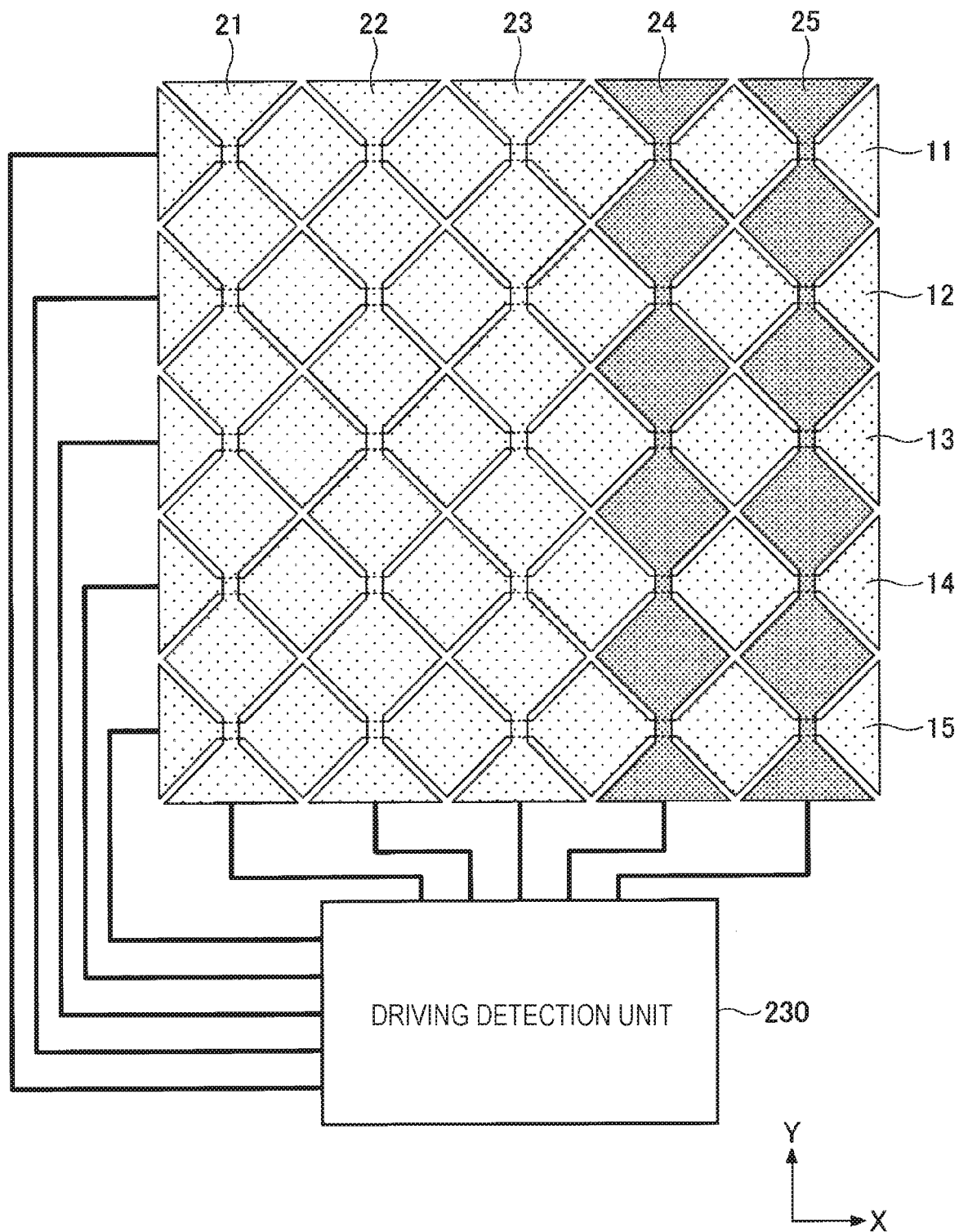
FIG. 13 is a diagram illustrating the touch sensor when the electrodes are in a third connection state, according to the second embodiment.

Subsequently, as illustrated in FIG. 13, the selector 260 connects the Y-direction electrode 24 to the detection circuit 140, the Y-direction electrode 25 to the detection circuit 141, and the X-direction electrodes 11 to 15 and the Y-direction electrodes 21 to 23 to the shield driving circuit 150. In this state, alternating voltage is applied to the X-direction electrodes 11 to 15 and the Y-direction electrodes 21 to 25, and the Y-direction electrodes 24 and 25 connected to the detection circuits 140 and 141 may measure current supplied to the Y-direction electrodes 24 to 25 using the ammeters 140c and 141c included in the detection circuits 140 and 141, respectively.

Accordingly, in this embodiment, the driving detection unit 230 performs switching of connections using the selector 260 under control of the controller 131 so that electrodes to be connected to the detection circuits are successively selected from among the X-direction electrodes 11 to 15 and the Y-direction electrodes 21 to 25 and the selected electrodes are connected to the detection circuits.

As described above, the state illustrated in FIG. 11, the state illustrated in FIG. 12, and the state illustrated in FIG. 13 are repeated in this order, an X-direction electrode which receives a largest amount of current is selected from among the X-direction electrodes 11 to 15, and a Y-direction electrode which receives a largest amount of current is selected from among the Y-direction electrodes 21 to 25 so that a two-dimensional position of a finger 100 or the like may be detected. Accordingly, in this embodiment, even when the number of detection circuits is smaller than the number of X-direction electrodes or the number of Y-direction electrodes, a movement of the finger 100 or the like may be obtained.

Portions other than the description above are the same as those of the first embodiment.

Third Embodiment

Figure 14:
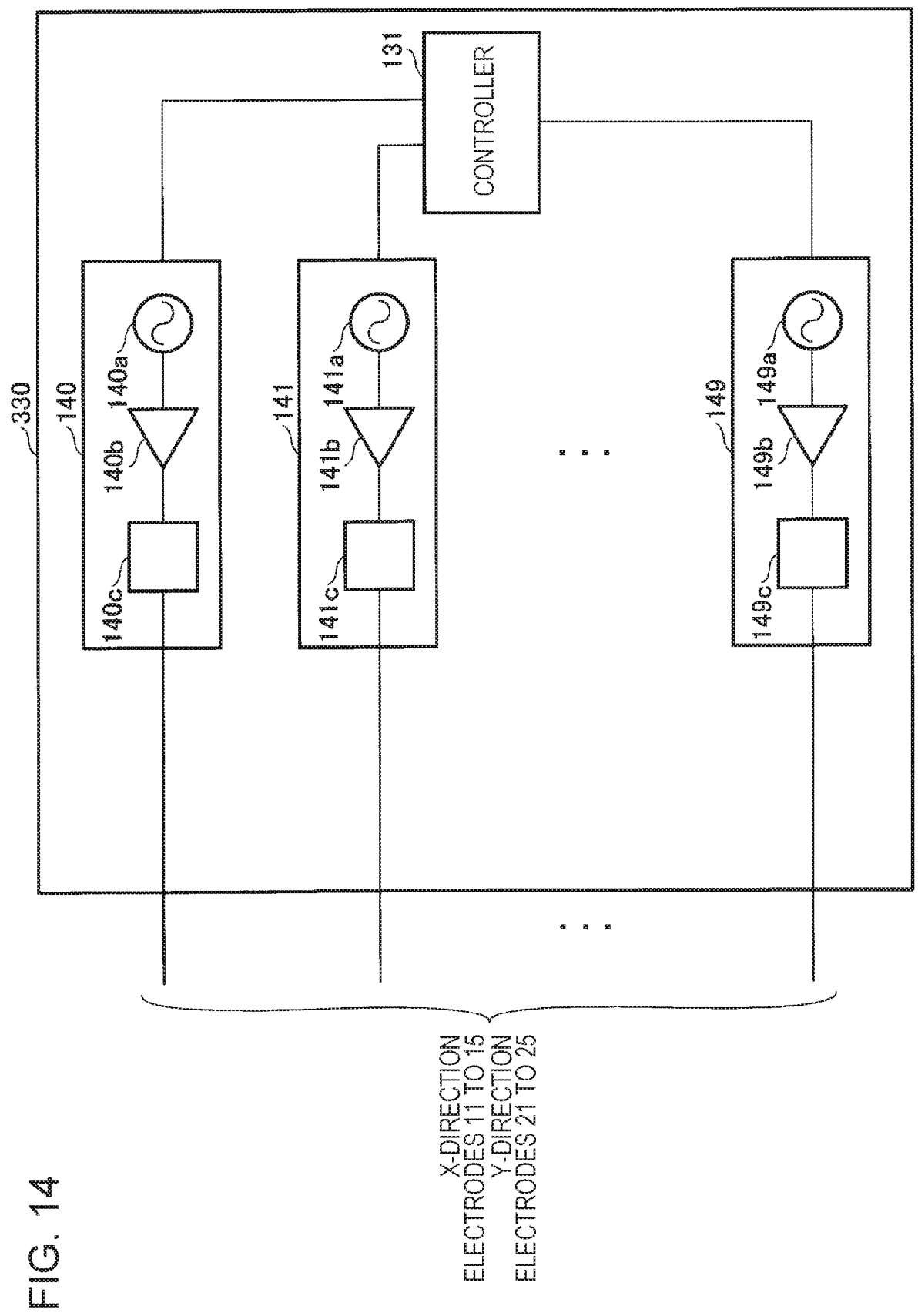
FIG. 14 is a diagram illustrating a configuration of a driving detection unit of a touch sensor according to a third embodiment.

Next, a touch sensor according to a third embodiment will be described. The touch sensor of this embodiment corresponds to the touch sensor illustrated in FIG. 5, and as illustrated in FIG. 14, a driving detection unit 330 includes detection circuits 140 to 149 corresponding to the number of X-direction electrodes 11 to 15 and the number of Y-direction electrodes 21 to 25. In this embodiment, the detection circuits 140 to 149 corresponding to the X-direction electrodes 11 to 15 and the Y-direction electrodes 21 to 25 are respectively connected to the X-direction electrodes 11 to 15 and the Y-direction electrodes 21 to 25, and alternating voltage is applied to the X-direction electrodes 11 to 15 and the Y-direction electrodes 21 to 25 from the detection circuits 140 to 149. Therefore, a shield driving circuit is not provided according to this embodiment.

Figure 15:
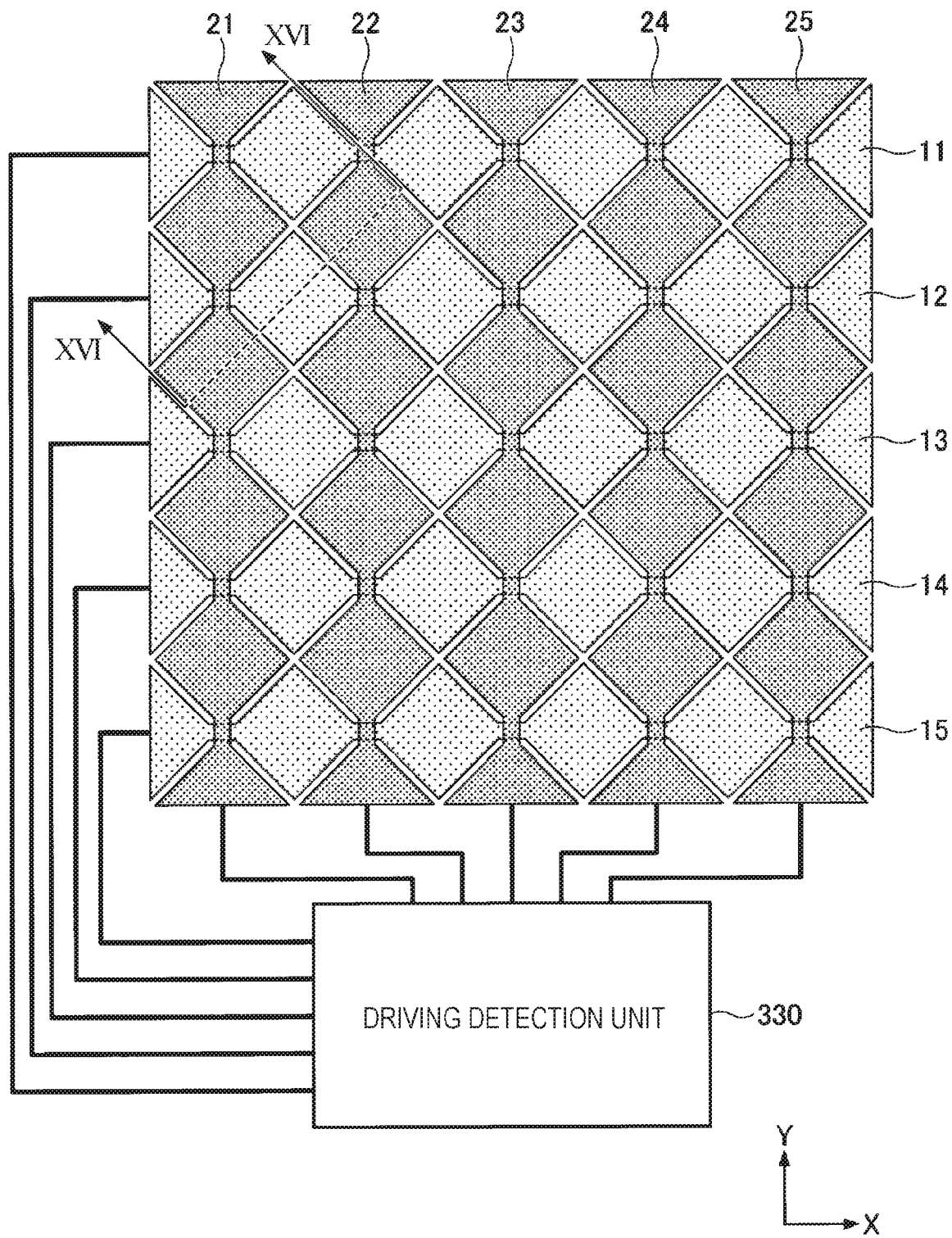
FIG. 15 is a diagram illustrating the touch sensor according to the third embodiment.

Specifically, as illustrated in FIG. 15, all the X-direction electrodes 11 to 15 and the Y-direction electrodes 21 to 25 are connected to the corresponding detection circuits 140 to 149, and therefore, position detection using the X-direction electrodes 11 to 15 and position detection using the Y-direction electrodes 21 to 25 may be simultaneously performed. Accordingly, although the number of detection circuits is large, switches and a shield driving circuit are not required.

Portions other than the description above are the same as those of the first embodiment.

Fourth Embodiment

Next, a touch sensor according to a fourth embodiment will be described. In this embodiment, the touch sensor illustrated in FIG. 5 is used, and amplitude of alternating voltage supplied from a shield driving circuit 150 is larger than amplitude of alternating voltage supplied from the detection circuits 140 to 149. Such control of alternating voltage may be performed by a controller 131 included in a driving detection unit 130.

Figure 16:
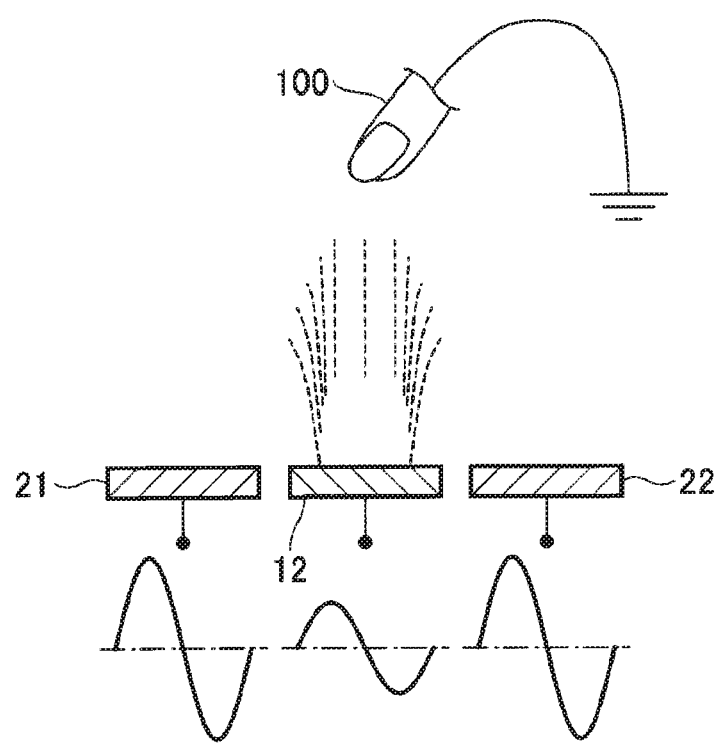
FIG. 16 is a diagram illustrating a touch sensor according to a fourth embodiment.

According to this embodiment, since amplitude of alternating voltage applied to Y-direction electrodes 21 and 22 which are non-selected electrodes positioned adjacent to an X-direction electrode 12 is larger than amplitude of alternating voltage applied to the X-direction electrode 12 which is a selected electrode, an amount of component in a Z direction of electric lines of force generated from the X-direction electrode 12 is larger than that in the case of FIG. 8 as illustrated in FIG. 16, and therefore, directivity may be further improved. Note that FIG. 16 is a cross-sectional view taken along a broken line XVI to XVI in FIG. 15.

Note that portions other than the description described above are the same as those of the first embodiment and may be applied to the second embodiment.

Fifth Embodiment

Figure 17:
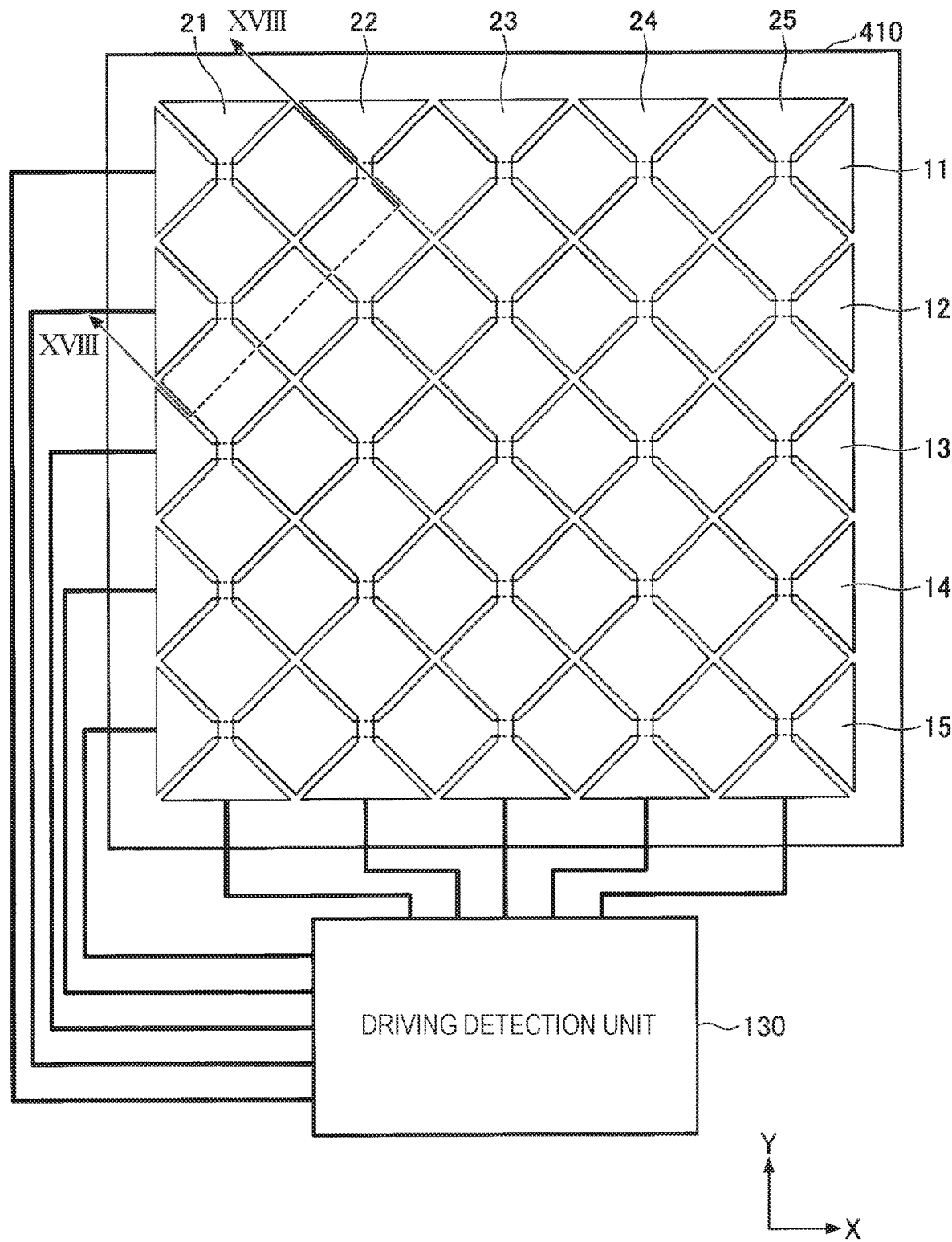
FIG. 17 is a diagram illustrating a configuration of a touch sensor according to a fifth embodiment.
Figure 18:
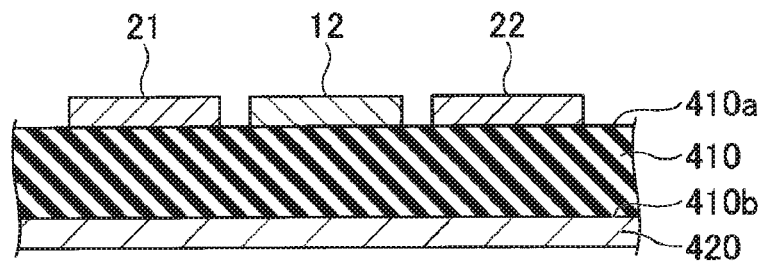
FIG. 18 is a cross-sectional view of the touch sensor according to the fifth embodiment.

Next, a touch sensor which is an electrostatic sensor according to a fifth embodiment will be described. In the touch sensor of this embodiment, X-direction electrodes 11 to 15 and Y-direction electrodes 21 to 25 are disposed on one surface 410a, which is a front surface, of an insulating body substrate 410, and a shield electrode 420 is disposed on the other surface 410b which is the other side of the surface 410a as illustrated in FIGS. 17 and 18. Note that FIG. 18 is a cross-sectional view taken along a broken line XVIII to XVIII in FIG. 17.

The shield electrode 420 is formed so as to cover the entire surface 410b of the insulating body substrate 410 and covers the X-direction electrodes 11 to 15 and the Y-direction electrodes 21 to 25 from a back surface. Specifically, in a plan view in a Z direction, the X-direction electrodes 11 to 15 and the Y-direction electrodes 21 to 25 are included in a region in which the shield electrode 420 is disposed. The shield electrode 420 is connected to a shield driving circuit 150 of a driving detection unit 130 and alternating voltage is applied to the shield electrode 420. In this way, since the shield electrode 420 is disposed and alternating voltage is applied by the shield driving circuit 150, an adverse effect of noise from the back side, that is, an adverse effect of noise generated on a side in which the shield electrode 420 is disposed, on the X-direction electrodes 11 to 15 and the Y-direction electrodes 21 to 25 may be suppressed.

Note that portions other than the description described above are the same as those of the first embodiment and may be applied to the second to fourth embodiments.

Although the embodiments are described in detail hereinabove, the present invention is not limited to specific embodiments and various modifications may be made within the claims.

The present application is based on, and claims priority from JP Application Serial Number 2017-243986, filed Dec. 20, 2017, the disclosure of which is hereby incorporated by reference herein in its entirety.

What is claimed is:

1. An electrostatic sensor for detecting a position of an object which is approaching the electrostatic sensor, the electrostatic sensor comprising:
    a first electrode group including a plurality of electrodes;
    a second electrode group including a plurality of electrodes disposed adjacent to the electrodes of the first electrode group;
    a plurality of detection circuits each configured to be selectively connected to a corresponding electrode among the electrodes of the first electrode group and the second electrode group, each detection circuit including a first AC power source and a current measurement unit, the first AC power source generating a first AC voltage;

a second AC power source configured to be selectively connected to remaining electrodes among the electrodes of the first electrode group and the second electrode group which are not connected to the detection circuits, the second AC power source generating a second AC voltage, the first and second AC voltages having a same frequency and a same phase; and a controller configured to successively and repeatedly select a target group of electrodes which are to be connected to the detection circuits at a time from among the electrodes of the first electrode group and the second electrode group, such that the target group of electrodes are connected to the detection circuits while the remaining electrodes are connected to the second AC power, thereby detecting a position of the object based on respective currents detected by the current measurement units in the detection circuits.

2. The electrostatic sensor according to claim 1, wherein the first AC voltage and the second AC voltage have a same amplitude.

3. The electrostatic sensor according to claim 1, wherein an amplitude of the first AC voltage is smaller than an amplitude of the second AC voltage.

4. The electrostatic sensor according to claim 1, wherein a number of the detection circuits is smaller than a number of the electrodes of the first electrode group or a number of the electrodes of the second electrode group.

5. The electrostatic sensor according to claim 1, further comprising:

an insulating substrate, wherein the plurality of electrodes of the first electrode group and the plurality of the electrodes of the second electrode group are disposed on a first surface of the insulating substrate; and a shield electrode disposed on a second surface of the insulating substrate opposite to the first surface, wherein the second AC voltage is applied to the shield electrode.

6. The electrostatic sensor according to claim 1, wherein the target group is one of the first group of electrodes and the second group of electrodes, while the remaining electrodes are the other of the first group of electrodes and the second group of electrodes.

7. The electrostatic sensor according to claim 1, wherein each of the plurality of electrodes in the first electrode group extends in a first direction, and each of the plurality of electrodes in the second electrode group extends in a second direction.

8. The electrostatic sensor according to claim 7, wherein the first and second directions are orthogonal to each other.

9. The electrostatic sensor according to claim 4, wherein the target group of electrodes are a sub-group of electrodes fewer than the first or second group of electrodes, which are selected from within the first group of electrodes, from within the second group of electrodes, or from among the first group of electrodes and the second group of electrodes.

10. An electrostatic sensor for detecting a position of an object which is approaching the electrostatic sensor, the electrode sensor comprising:

a first electrode group including a plurality of electrodes;

a second electrode group including a plurality of electrodes disposed adjacent to the electrodes of the first electrode group;

a plurality of detection circuits each connected to respective one of the electrodes of the first electrode group and the second electrode group, each detection circuit including a first AC power source and a current measurement unit; and a controller configured to detect a position of the object to be detected based on a plurality of currents detected by a plurality of the current measurement units of the detection circuits connected to the electrodes of the first electrode group and the second electrode group.

11. The electrostatic sensor according to claim 10, wherein the plurality of electrodes in the first electrode group extend in a first direction and are arranged in a second direction crossing the first direction, while the plurality of electrodes in the second electrode group extend in the second direction and are arranged in the first direction.

* * * * *